(12) United States Patent
Lehn

(10) Patent No.: US 6,475,267 B2
(45) Date of Patent: Nov. 5, 2002

(54) SYSTEM AND METHOD FOR REMOVING GAS FROM A STREAM OF A MIXTURE OF GAS AND PARTICULATE SOLIDS

(75) Inventor: Christopher S. Lehn, Basking Ridge, NJ (US)

(73) Assignee: Foster Wheeler Energy Corporation, Clinton, NJ (US)

( * ) Notice: Subject to any disclaimer, the term of this patent is extended or adjusted under 35 U.S.C. 154(b) by 2 days.

(21) Appl. No.: 09/734,708

(22) Filed: Dec. 13, 2000

(65) Prior Publication Data
US 2002/0069757 A1 Jun. 13, 2002

(51) Int. Cl.[7] ............ B01D 45/12; F23D 1/02
(52) U.S. Cl. ............ 95/271; 55/396; 55/459.1; 55/466; 110/229; 110/264
(58) Field of Search ............ 95/271; 55/394, 55/396, 397, 398, 459.1, 466; 110/218, 229, 230, 264

(56) References Cited

U.S. PATENT DOCUMENTS

| | | | |
|---|---|---|---|
| 2,118,600 A | | 1/1935 | Frisch ............ 110/104 |
| 4,147,116 A | * | 4/1979 | Graybill ............ 110/263 |
| 4,348,170 A | * | 9/1982 | Vatsky et al. ............ 239/416.5 |
| 4,412,496 A | | 11/1983 | Trozzi ............ 110/347 |
| 4,448,135 A | | 5/1984 | Dougan et al. ............ 110/263 |
| 4,497,263 A | | 2/1985 | Vatsky et al. ............ 110/347 |
| 4,688,496 A | * | 8/1987 | Schreter ............ 110/264 |
| 5,090,339 A | | 2/1992 | Okiura et al. ............ 110/263 |
| 6,053,118 A | | 4/2000 | Okamoto et al. ............ 110/261 |
| 6,116,171 A | * | 9/2000 | Oota et al. ............ 110/263 |

FOREIGN PATENT DOCUMENTS

| | | |
|---|---|---|
| EP | 0 836 049 | 4/1988 |
| FR | 2 773 388 | 1/1998 |
| JP | 60-194208 | 10/1985 |

OTHER PUBLICATIONS

International Search Report dated Jul. 30, 2002, issued in corresponding international patent appln. no. PCT/IB 01/02378.

* cited by examiner

Primary Examiner—Robert A. Hopkins
(74) Attorney, Agent, or Firm—Fitzpatrick, Cella, Harper & Scinto

(57) ABSTRACT

A system for removing gas from a stream of a mixture of gas and particulate solids. The system includes a separation vessel having an upstream end portion and a downstream cowl portion, the upstream end portion having an inlet for introducing the stream tangentially into the vessel to separate centrifugally from the stream (i) a rich portion, comprising a solids-rich mixture, proceeding along a helical path at an outer annular portion of the separation vessel to the cowl portion, and (ii) a lean portion, comprising a solids-lean mixture, proceeding along a helical path at an inner portion of the separation vessel to the cowl section, multiple helical ports through which the rich portion proceeds axially through the cowl section, without significantly losing its momentum, to be discharged axially from the separation vessel, and multiple passages between the helical ports through which the lean portion proceeds radially outwards to be discharged from the separation vessel.

25 Claims, 4 Drawing Sheets

SYSTEM AND METHOD FOR REMOVING GAS FROM A STREAM OF A MIXTURE OF GAS AND PARTICULATE SOLIDS

BACKGROUND OF THE INVENTION

The present invention relates to a system and method for removing gas from a stream of a mixture of gas and particulate solids. The invention is especially applicable for removing air from a stream of a mixture of pulverized coal and air to be injected to a pulverized coal furnace.

For use in pulverized coal furnaces, coal is typically pulverized in a mill into a particulate state and then delivered to the furnace, suspended in air. It is conventional to use the same air for grinding the coal, drying the coal, transporting the coal to a burner, and finally, for injecting the coal into the combustion chamber of the furnace. This air is commonly referred to as "primary air". The amount of primary air used for injecting the coal into the combustion chamber is an important variable with respect to the ignition and combustion efficiency of the coal. The amount of air is not, however, generally variable because of the requirements of adequate grinding, drying and transportation of the coal. Therefore, the ratio of primary air to coal resulting in optimal ignition and combustion efficiency is generally not achieved unless the amount of air is controlled separately, prior to the burner.

When burning low volatile fuels, such as anthracite, which are not easily ignitable, a decrease in the primary air-to-coal ratio may be required for efficient ignition and burning. Especially, there is a need to arrange means to remove excess primary air when the fuel is changed to a harder-to-burn coal. Also, low load burning may require a decrease in the amount of primary air injected into the combustion chamber to offset the decrease in fuel.

The idea of arranging a centrifugal separator above a vertical burner in order to control the concentration of fuel delivered to the burner is disclosed in U.S. Pat. No. 2,118,600. U.S. Pat. No. 4,412,496 shows an external cyclone to be used at low loads for separating a large quantity of air from a coal-air mixture, and producing a coal-rich stream to be delivered to the furnace through an inner nozzle of a burner and a coal-lean stream delivered to the furnace through an annular passage in a coaxial relationship to the inner nozzle. The cyclone separators are complex and expensive constructions which, especially when used with horizontal burners, may lead to problems related to the transport of the dense stream to the burner.

Also, many other solutions have been suggested for removing air from a coal-air stream. U.S. Pat. No. 4,497,263 discloses a burner with a louvered conical inner part to increase the coal concentration of the inner stream. U.S. Pat. No. 4,448,135 suggests a take-off conduit to be arranged downstream of an elbow section in a burner to remove a coal-lean portion from the coal-air stream. U.S. Pat. No. 5,090,339 shows a throat nozzle immediately upstream of a sleeve part, thus directing a coal-rich stream into the central section of a burner. These types of constructions may suffer high pressure losses and/or have a low separation efficiency.

Japanese patent publication No. 60-194208 discloses an arrangement in which a coal-air mixture is introduced tangentially into an annular space of a horizontal burner, whereby the coal-rich and coal-lean portions are divided by centrifugal force into radially separate partitions. The coal-lean portion is then directed in a switch-over part of the burner, located within the windbox of a burner system, through narrow channels from the inside of the coal-rich portion to outside of it, to be mixed with secondary air. In this construction, both portions of the coal-air mixture are layered in the same combustion zone. Moreover, when using this construction, the coal-rich stream may be disrupted by the channels of the coal-lean stream, and there is a considerable and non-controllable pressure loss of the coal-lean stream, which limits the amount of air which is separated from the coal-rich stream.

SUMMARY OF THE INVENTION

It is an object of the present invention to provide a system and method for removing gas from a stream of a mixture of gas and particulate solids.

Especially, it is an object of the present invention to provide a system and method for removing gas from a stream of a mixture of gas and particulate solids without causing stagnation of the solids or any major pressure drops in the stream.

Also, it is an object of the present invention to provide a system and method for a pulverized coal fired furnace in which the coal concentration of a coal-air stream to be injected into the furnace can be effectively increased.

Additionally, it is an object of the present invention to provide a system and method for a pulverized fuel fired furnace in which a controllable amount of excess air can be removed from a fuel-air stream, upstream of a burner, using a simple device.

In order to achieve these and other objects, the present invention provides a system for removing gas from a stream of a mixture of gas and particulate solids. The system comprises a separation vessel having an upstream end portion and a downstream cowl section, the upstream end portion having an inlet for introducing the stream tangentially into the vessel so as to separate centrifugally from the stream (i) a rich portion comprising a solids-rich mixture, proceeding along a helical path at an outer annular portion of the separation vessel to the cowl section, and (ii) a lean portion, comprising a solids-lean mixture, proceeding along a helical path at an inner portion of the separation vessel to the cowl section; multiple helical ports through which the rich portion proceeds axially through the cowl section, without significantly losing its momentum, to be discharged axially from the separation vessel; and multiple passages between the helical ports through which the lean portion proceeds radially outwards to be discharged from the separation vessel.

In another aspect, the present invention provides a method for removing gas from a stream of a mixture of gas and particulate solids, comprising the steps of introducing the stream tangentially into a separation vessel through an inlet at an upstream end portion of the vessel; separating centrifugally from the stream a rich portion, comprising a solids-rich mixture, and a lean portion, comprising a solids-lean mixture; allowing the rich portion to proceed along a helical path at an outer annular portion of the separation vessel to a cowl section at a downstream end portion of the separating vessel; allowing the lean portion to proceed along a helical path at an inner portion of the separation vessel to the cowl section; allowing the rich portion to proceed axially through the cowl section through at least two helical ports, without significantly losing its momentum, and discharging the rich portion axially from the separation vessel; allowing the lean portion to proceed radially outwards through multiple passages between the helical ports and discharging the lean portion from the separation vessel.

According to a typical application of the present invention, air is removed from a coal-air stream to be injected to a low volatile coal burner located on a wall of a pulverized coal fired furnace. Typically, a coal mill provides the original fuel-air stream, which is pneumatically transported to a set of burners. The burners are preferably arranged on the vertical sidewalls of the furnace, thus having a horizontal axis, but they may also be in another direction. According to a preferred embodiment of the present invention, upstream of each burner is connected a primary air separator. According to another preferred embodiment of the present invention, upstream of more than one burner is connected a common air separator.

One of the advantages of the air separation system according to the present invention is that it functions horizontally and can thus be connected to burners having a horizontal axis, without any constructional or operational difficulties. On the other hand, the air separation system according to the present invention is not designed as an integral part of a burner, but it can be located at some distance from the burner, typically outside the windbox of the burner system. Thus, the air separation system according to the present invention can be used in connection with different types of burners and suits well to retrofits of pulverized coal power plants.

The basic idea of the present invention is to maintain the momentum of the fuel-air mixture while it proceeds through the separator. By permitting the mixture to flow smoothly through a separation vessel, without reversing or suddenly changing the flow direction of the fuel-air stream, pressure losses can be simultaneously minimized and stagnation and settling of solids avoided.

It is generally known to introduce a mixture of gas and solid particles tangentially into a tubular separation vessel and to allow the centrifugal force to separate particles from the gas as the mixture proceeds through the vessel. However, in such systems, a particle-rich stream is formed at the outer annular portion of the vessel and a particle-lean stream is correspondingly formed at the inner portion. In order to remove excess gas from the particle-lean stream, the particle lean stream should be directed outwards and away from the particle-rich stream without significantly disrupting the smooth flow of the particle-rich stream.

According to the present invention, the removal of excess gas from a solids-gas stream, or a coal-lean stream from a coal-air mixture, takes place in a cowl section at the downstream end portion of the separation vessel. The fuel-rich portion flows axially across the cowl section through a set of helical ports, i.e., helically twisted short channels, and the coal-lean portion flows radially outwards through passages between the helical ports. Thus, the flow of the coal-rich stream is confined from a full annular space to multiple channels, or ports, but the ports are formed in a specific way to maintain the momentum of the stream. The coal-rich stream typically proceeds from the separation vessel to a burner on a sidewall of the furnace where it is mixed with secondary air and combusted.

According to a preferred embodiment of the present invention, the cowl section is defined by an outer wall and first and second end plates. The coal-rich and coal-lean portions of the coal-air mixture enter the cowl section through the corresponding inlet openings in the first end plate. The upstream ends of the helical ports are connected to the inlet openings of the coal-rich portion, and thus, the coal-rich portion is divided into multiple coal-rich substreams. The downstream ends of the helical ports are connected to the outlet openings for the coal-rich substreams in the second end plate, and the coal-rich substreams are discharged from the cowl section through the outlet openings. The coal-lean portion is discharged from the cowl section through an outlet opening in the outer wall.

According to a preferred embodiment of the present invention, a conical tube is provided within the cowl section, and radially inside of the conical tube, a cylindrical tube. The conical and cylindrical tubes form the roofs and floors, respectively, of the helical ports. The roof and the floor of each helical port are connected by two sidewalls, which may be referred to as leading and trailing sidewalls, as the ports are at an angle with respect to the axis of the helical trajectory of the stream.

The helical ports are twisted around the cylindrical surface so that the angular orientation of the outlet openings is rotated from that of the corresponding inlet openings. The direction and the extent of the rotation of the ports correspond to those of the trajectory of the coal-air stream around the axis of the separation vessel. The rotation angle varies, preferably, from about 20° to about 40°, but it can be, e.g., from about 5° to about 60°, depending on the axial length of the cowl section and the pitch of the trajectory of the coal-air stream.

The coal-lean portion enters the cowl section through a circular inlet opening arranged at the first end plate of the cowl section radially inside the inlet openings of the coal-rich substreams. The second end wall of the cowl section does not include outlet openings for the coal-lean portion. Instead, the conical and cylindrical tubes have elongated openings in between the helical ports, through which the fuel-lean stream can flow radially outwards. Typically, the helical ports and the first and second end plates define radial passages between the openings in the conical and cylindrical tubes, through which passages the fuel-lean portion can flow radially outwards.

According to the present invention, the coal-lean stream is allowed to maintain its rotational momentum while proceeding through the separation vessel, but the axial momentum is affected by the second end plate of the cowl section. As the lean stream mainly consists of gas, it will, however, change its direction without causing any major pressure drops or solids stagnation. The elongated openings in the cylindrical and conical tubes provide a wide region and enough cross-sectional area for the change of the flow direction.

According to a preferred embodiment of the present invention, the coal-lean substreams are collected in an annular collection space arranged between the conical tube and the outer wall of the cowl section. The fuel-lean portion may be discharged from the collection space via a tangential discharge channel connected to an opening in the outer wall. Preferably, the collection space includes block-off means, which forces all of the lean stream in the collection space to circulate in the same direction before being discharged via an outlet channel. In this way, all solids will be effectively swept off from the collection space. The fuel-lean portion discharged from the cowl section may be introduced to the furnace through a nozzle spaced away from the nozzle of the fuel-rich portion, or it may be conveyed back to the coal mill, or to some other remote location.

According to a preferred embodiment of the present invention, the cylindrical tube within the cowl section, including openings for the fuel-lean portion and forming the bottoms of the helical ports, extends to some extent upstream of the first end plate of the cowl section. The inlet openings for the coal-lean and coal-rich portions are located radially inside and outside, respectively, of the extension of the cylindrical tube. Thus, the extension of the cylindrical tube forms a separating wall which separates the rich and lean streams from each other as early as upstream of the cowl section.

In some applications, funnel means can be arranged on the radially outer side of the separating wall, upstream of the first end plate of the cowl section, directing the particle-rich stream into the inlet openings of the helical ports. Also, there can be inner vanes connected with the inner side of the cylindrical tube, or the separation wall, the vanes being curved like the helical trajectory of the coal-air stream. Preferably, the inner vanes extend from the upstream end of the separation wall to the second end plate of the cowl section. The inner vanes are preferably connected to the trailing sidewalls of the helical ports, adjacent to the leading edges of the radial passages between the helical ports conducting the lean flow smoothly to the openings between the helical ports.

In some applications of the present invention, an inner tube is provided around the axis of the separation vessel, and the fuel-air mixture flows in an annular volume around the inner tube. The inner tube may, e.g., include a heavy oil start-up burner. Preferably, the inner vanes extend radially inwards up to the inner tube, thus dividing the lean stream into several substreams. However, the present invention may also be used in connection with a separation vessel without an inner tube, whereby the air-fuel mixture fills the separation vessel all the way to the axis of the separation vessel.

The general features and advantages of the present invention are described above in connection with the treatment of primary air to be led to the burners of a pulverized coal fired furnace. It is, however, obvious to a skilled person in the art that the present invention also is well suited to other applications, e.g., in other processes such as in the chemical industry or bulk material handling, where separation of excess gas from a stream of a mixture of gas and particulate solids is required.

BRIEF DESCRIPTION OF THE DRAWINGS

The above brief description, as well as further objects, features and advantages of the present invention will be more fully appreciated by reference to the following detailed description of the presently preferred, but nonetheless illustrative, embodiments in accordance with the present invention, when taken in conjunction with the accompanying drawings, wherein.

DETAILED DESCRIPTION OF THE PREFERRED EMBODIMENTS

Figure 1:
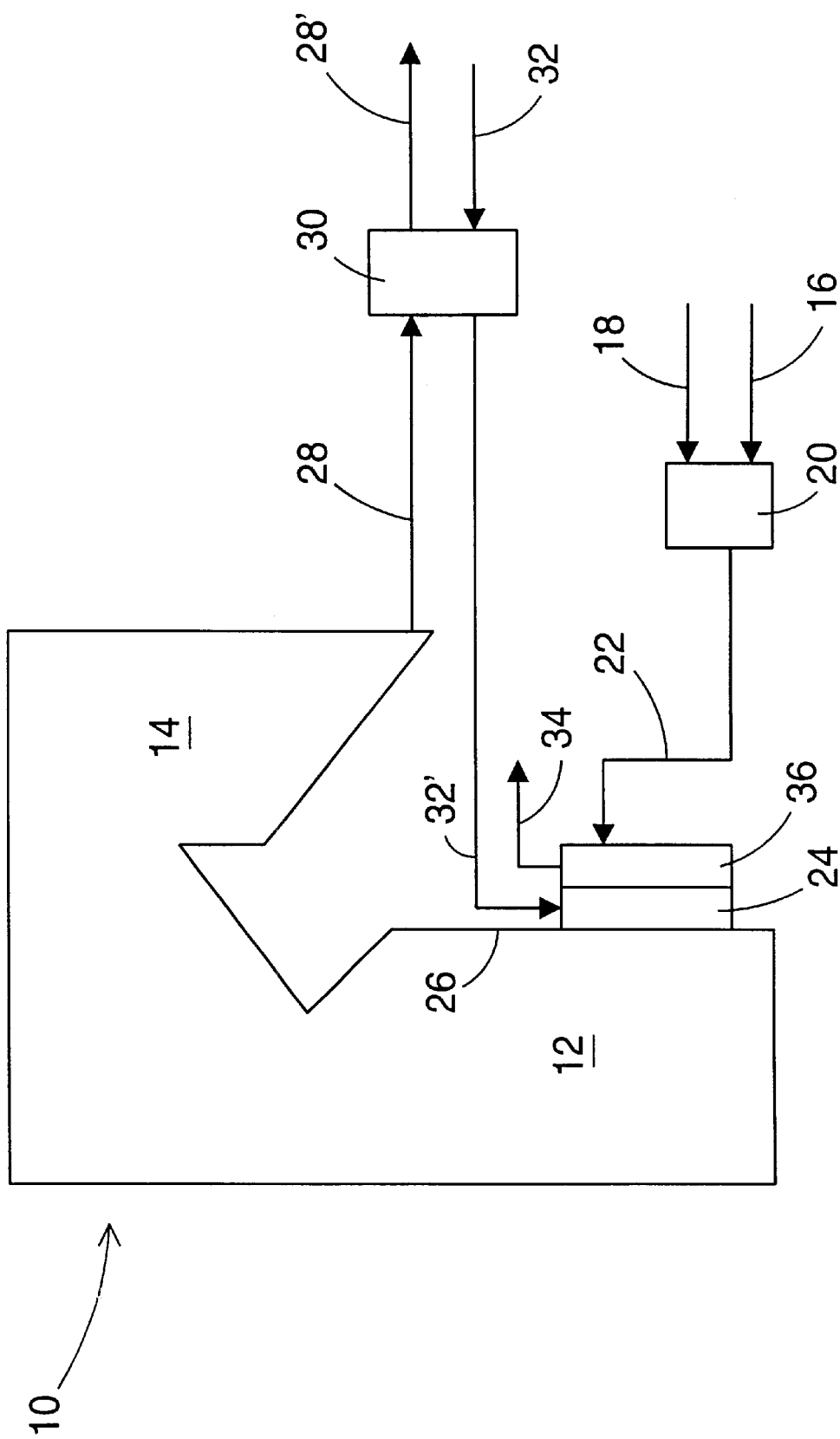
FIG. 1 is a schematic elevational view of a pulverized coal combustion system according to an exemplary embodiment of the present invention.

FIG. 1 depicts a pulverized coal combustion system 10 according to a preferred embodiment of the present invention. The combustion system 10 is typically used for generation of steam and includes a furnace section 12 and a heat recovery section 14. For use in the combustion system 10, coarse-grained coal 16 and air 18 are introduced into a coal mill 20, in which a mixture 22 of pulverized coal and primary air is produced to be pneumatically conveyed into a burner section 24 of combustion system 10. The burner section 24 typically comprises a plurality of burners arranged on a sidewall 26 of the furnace 12. FIG. 1 shows only one burner section 24 on the sidewall 26, but there also could be several burner sections on more than one wall of the furnace 12.

Hot exhaust gases produced by the combustion processes in the furnace 12 are used for producing steam in the heat recovery section 14. From the heat recovery section 14, the exhaust gases 28 are led to an air heater 30 in which the exhaust gases are cooled, whereby a stream of cooled exhaust gases 28' is produced. Typically, the cooled exhaust gases 28' are led via gas cleaning units to a stack, not shown in the drawing. A stream of air 32 is also introduced to the air heater 30 so as to produce hot secondary air 32' to be led to the burner section 24.

According to a preferred embodiment of the present invention, adjacent to the burner section 24 is arranged an air separator system 36 to separate a portion of the primary air from the mixture 22 of coal and primary air entering the burner section 24. The separated air stream 34, typically still including some coal, is discharged from the air separator system 36, upstream of the burner section 24. The air stream 34 contains preferably less than 10%, even more preferably less than 2%, of the coal of the original coal-air mixture 22. The air stream 34 may be conveyed to another portion of the furnace 12, back to the coal mill 20, or to some other location.

Figure 2:
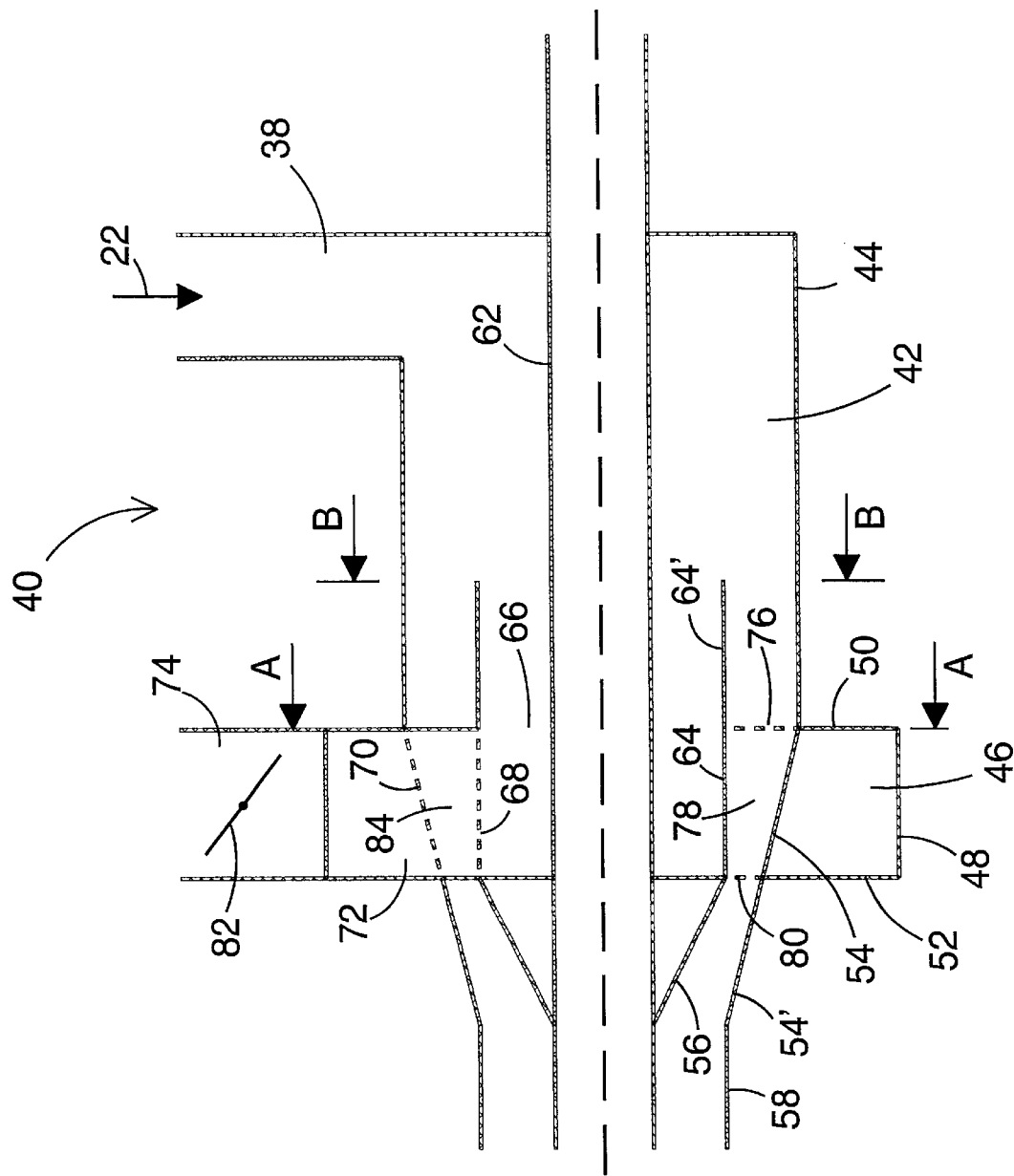
FIG. 2 is a schematic, longitudinal cross-sectional view of an air separator according to an exemplary embodiment of the present invention.

FIG. 2 shows in more detail an example of an air separator according to a preferred embodiment of the present invention. A mixture 22 of coal and primary air is introduced through an inlet line 38 tangentially to the upstream end of a separation vessel 40, where a portion of the primary air is separated from the coal-air mixture 22 and a coal-rich stream is produced. The inlet line 38 is preferably connected to the separation vessel 40 as a helical volute inlet so as to impart axial momentum to the flow. The separation vessel 40 comprises a first section 42, defined by a cylindrical outer wall 44 and a cowl section 46 at the downstream end of the separation vessel 40. The cowl section 46 is defined by a second outer wall 48 and first 50 and second 52 end plates.

The cowl section 46 comprises a conical tube 54 and a cylindrical tube 64 radially inside the conical tube 54. The conical tube 54 includes an extension 54' extending from the center portion of the cowl section 46 downstream of the second end plate 52. Downstream of the second end plate 52 is also arranged another conical tube 56 radially inside the extension 54' of the conical tube 54. In between the conical tubes 54' and 56 is formed an annular area, with a gradually reducing outer diameter, leading to a passage 58 towards the furnace 12 (shown in FIG. 1), for injecting the coal-rich stream into the furnace 12.

FIG. 2 also shows an inner tube 62 arranged around the axis of the separation vessel 40. When the air separator is connected to a burner, the inner tube 62 may include means for introducing additional hot air or, e.g., a start-up oil burner could be provided. These are not, however, shown in the drawing.

When the stream of coal-air mixture 22 is introduced into the separation vessel 40 through the tangential inlet 38, the stream proceeds in the vessel along a helical path, whereby coal particles of the coal-air mixture 22 are centrifugally pushed towards the cylindrical outer wall 44. Thus, a coal-rich stream is formed at an outer annular portion of the separation vessel 40, and a coal-lean stream remains closer to the axis of the vessel 40. At the downstream end of the first section 42 of the separation vessel 40, an extension of the cylindrical tube 64 forms a cylindrical separation wall 64'. The separation wall 64' divides the coal-air mixture into an outer, coal-rich portion between the cylindrical outer wall 44 and the cylindrical separation wall 64', and into an inner, coal-lean portion between the cylindrical separation wall 64' and the inner tube 62.

Around the inner tube 62, the first end plate 50 comprises an annular opening 66 for the coal-lean stream to proceed into the cowl section 46. In the cowl section 46, the coal-lean portion is directed radially outwards through openings 68 and 70 in the cylindrical tube 64 and the conical tube 54, respectively. Typically, several openings, 68 and 70, are respectively provided at fairly even intervals on the perimeters of the cylindrical tube 64 and the conical tube 54. The coal-lean substreams, flowing through the various openings, 68 and 70, are recombined in an annular collection chamber 72 formed between the second outer wall 48 and the conical tube 54. The recombined coal-lean stream is then directed out of the separation vessel 40 through a tangential, upwards pointing (in this view) vent line 74.

The coal-rich portion proceeds to the cowl section 46 through inlet openings 76 in the first end plate 50. The coal-rich substreams then proceed through the cowl section 46 via multiple helical ports 78 connected to the inlet openings 76 in the first end plate 50 and to outlet openings 80 in the second end plate 52. The conical tube 54 and the cylindrical tube 64 form the roofs and the floors, respectively, to the helical ports 78. The helical ports 78 are twisted around the axis of the separation vessel 40 in a direction and pitch corresponding to those of an average helical trajectory of the coal-rich stream in the first part 42 of the separation vessel 40.

As the helical ports 78 are defined between the cylindrical tube 64 and the conical tube 54, the radial extent, i.e., the height, of the outlet openings 80 is smaller than that of the inlet openings 76. Therefore, in order to maintain an approximately constant cross-sectional area, the peripheral extent, i.e., the width, of the outlet openings 80 may correspondingly be larger than that of the inlet openings 76. Typically, the width-to-height ratio of the outlet openings 80 is preferably at least 1.5 times larger, even more preferably, at least 3 times larger, than that of the inlet openings 76.

Due to the particular shallowing and widening shape of the ports, they direct the coal-rich substreams back to a nearly circular trajectory approaching the axis of the system. In some applications of the present invention, the surfaces which form the roofs and floors of the helical ports 78 may have a similar shape, i.e., they are both either conical or cylindrical. Then, the helical ports may have a cross section which is at least close to being constant.

The splitting ratio of the original coal-air stream into the coal-rich and coal-lean flows is determined by the pressure balance between the two flows. Thus, dimensioning of the corresponding flow areas mainly defines the flow splits and related pressure drop. However, the vented flow through the vent line 74 may be adjusted by flow regulation means, such as a valve 82.

FIG. 2 shows a radial passage 84 for a lean substream connecting the openings, 68 and 70, in the upper part of the cowl section 46 and a passage, i.e., a helical port 78, for a coal-rich substream in the lower part of the cowl section 46. In a typical application of the present invention, there are, in fact, several helical ports 78 distributed approximately evenly throughout the perimeter of the cowl section 46 and several radial passages 84 arranged in between the helical ports 78. In a preferred embodiment of the present invention, the number of helical ports 78 is about six, usually from four to eight. In some applications, the number of helical ports 78 may be as low as three, whereas, in some other applications, a larger number of helical ports 78, e.g., ten or even more, is required.

Figure 3:
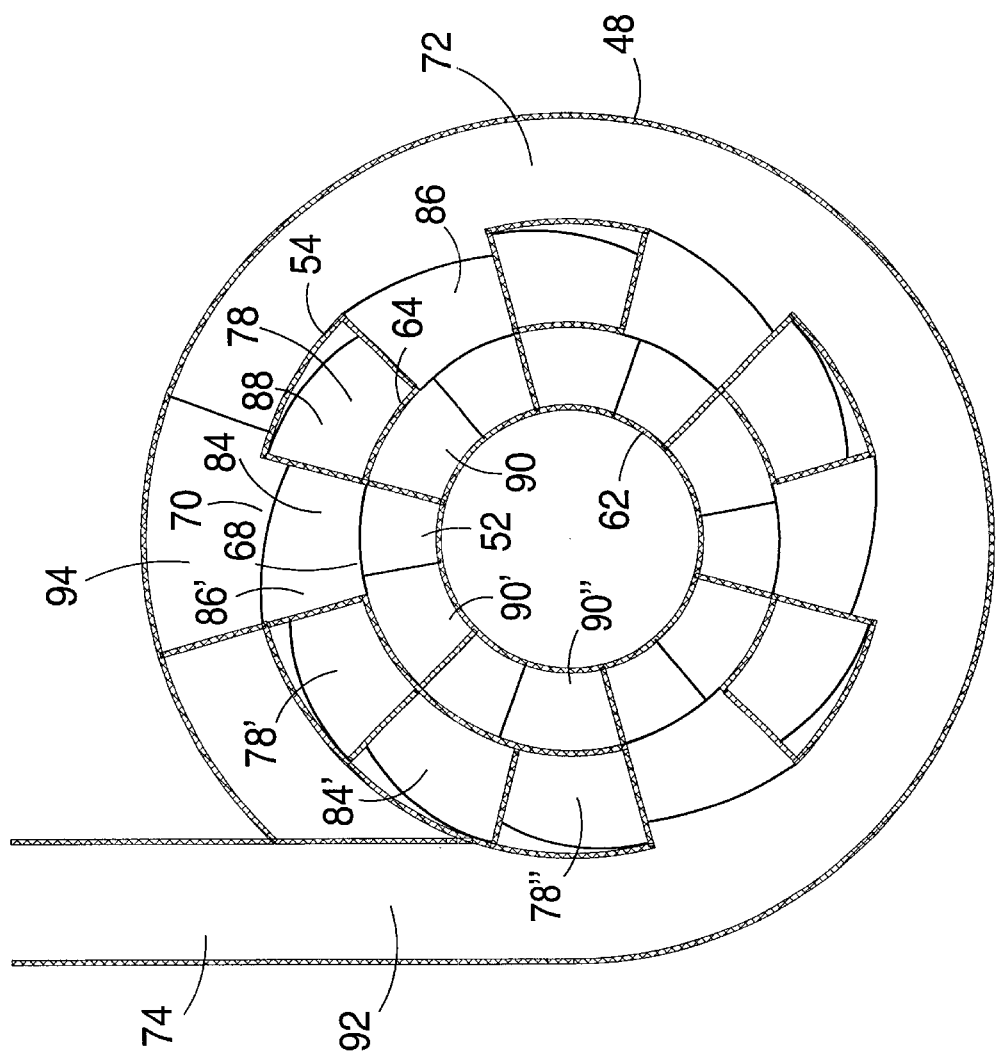
FIG. 3 is a schematic, transverse cross-sectional view of the air separator of FIG. 2, taken along line A—A of FIG. 2.
Figure 4:
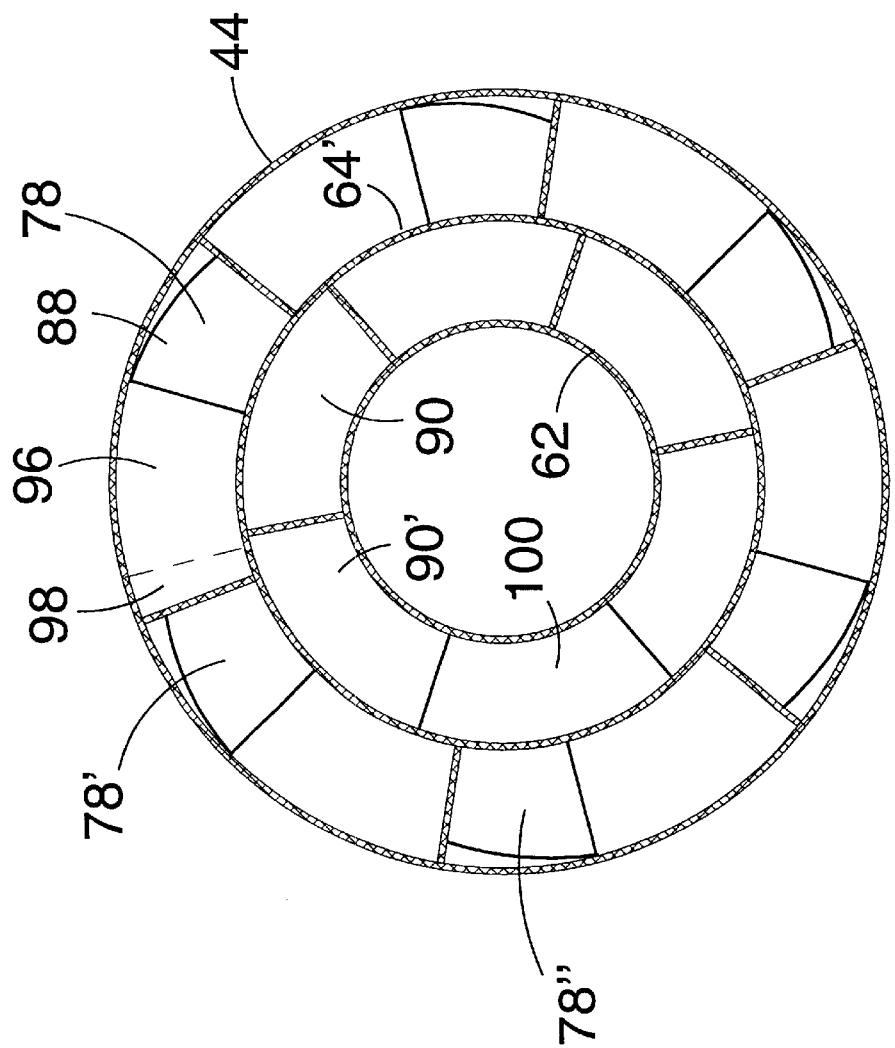
FIG. 4 is a schematic, transverse cross-sectional view of the air separator of FIG. 2, taken along line B—B of FIG. 2.

The arrangement of the passages for the coal-rich and coal-lean stream portions, according to a preferred embodiment of the present invention, is shown in more detail in FIGS. 3 and 4, which show transverse cross sections of the separation vessel 40, taken along lines A—A and B—B, respectively, of the embodiment shown in FIG. 2.

FIG. 3 shows a schematic cross-sectional view of the separation vessel 40, taken transversely to the axis of the vessel 40. This view is seen from the location of the first end plate 50 towards the cowl section 46, but the end plate 50 is not, however, shown. FIG. 3 illustrates the inner tube 62, sections of the cylindrical tube 64 with openings 68 in between the sections of the tube 64, sections of the conical tube 54 with openings 70 in between the sections of the conical tube 54, and the second outer wall 48.

The sections of the cylindrical tube 64 and the conical tube 54, together with leading sidewalls 86 and trailing sidewalls 88 define the helical ports 78, through which the coal-rich substreams flow axially through the cowl section 46. The sidewalls 88 and 86' of two successive helical ports 78 and 78', together with first and second end plates 50 and 52 of the cowl section, form radial passages 84 connecting the openings 68 to openings 70. The coal-lean substreams flow radially, through the radial passages 84, from between the inner tube 62 and the cylindrical tube 64 to the collection chamber 72.

Inner vanes 90 are provided between the inner tube 62 and the cylindrical tube 64. The inner vanes 90 are twisted helically and arranged in the cowl section 46 radially inside the trailing sidewalls 88 of the helical ports 78. Thus, the inner vanes 90 split the coal-lean stream into multiple substreams. Each coal-lean substream proceeds into the cowl section 46 through the annular opening 66 in the first end plate 50 and continues along a helical trajectory towards the second end plate 52. Due to its rotational momentum, e.g., the substream flowing between inner vanes 90' and 90 proceeds clockwise towards the inner vane 90 or the trailing sidewall 88 of a helical port 78. Finally, each coal-lean substream is pushed radially outwards through a radial passage 84 to the collection chamber 72, where the separate substreams are recombined. The widths of the radial passages 84 at the upstream end of the cowl section 46 are typically about as large or larger than the widths of the helical ports 78. Thus, the flow area of the passages 84 is sufficient for a low pressure drop for the coal-lean substreams.

In the outer wall 48 of the cowl section 46 is an opening 92, to which the vertically arranged vent line 74 of the coal-lean stream is connected. The extension of the vent line 74 within the collection chamber 72 is connected in a first helical port 78" so as to prevent counterclockwise flow from the collecting chamber 72 into the vent line 74. Thus, the whole coal-lean stream is forced to circulate in the same clockwise direction in the collection chamber 72, maximizing the sweeping of coal or any other possible solids from the collection space.

Because it may be difficult to provide a gas-tight seal between the extension of the vent line 74 and the conical roof of the helical port 78", it may be necessary to arrange a more efficient block-off means in between the helical ports 78" and the successive helical port 78' in the clockwise direction. This can be done by filling the corresponding area by a suitable material, e.g., refractory, which also prevents the coal-lean flow in the passage 84' between the helical ports 78" and 78'. Also, blocking plates 94 and 100 (see FIG. 4), can be used between the second outer wall 48 and the leading sidewall 86' of the helical port 78' and between the upstream ends of the inner vanes 90' and 90", respectively. When there is no coal-lean flow between the helical ports 78' and 78", also no openings are needed in the cylindrical tube 64 and the conical tube 54 at that location.

FIG. 3 shows the second outer wall 48 as having a circular cross section. However, in order to force the lean portion to distribute itself evenly to the different radial passages 84, the radial extent of the collecting chamber 72 should increase along the circumferential flow path. In this way, the collecting chamber volume is enlarged when more radial passages 84 reintroduce lean substreams that combine together. Thus, approximately the same superficial velocity will be maintained and pressure losses are minimized.

FIG. 4 shows a similar schematic transverse cross section taken at the upstream end of the cylindrical separation wall 64'. The inner tube 62 is shown radially inside the separation wall 64', and the cylindrical outer wall 44 radially outside the separation wall 64'. Between the inner tube 62 and the separation wall 64' are shown helically twisted inner vanes 90, 90', preferably extending from the upstream end of the separation wall 64' to the second end plate 52.

In order to conduct the coal-rich stream into the helical ports 78, funnel means may be arranged between the separation wall 64' and the cylindrical outer wall 44. According to a preferred embodiment of the present invention, the funnel means may comprise first ramp vanes 96 and second ramp vanes 98. The first ramp vanes 96 are preferably arranged nearly as a continuous extension of the trailing sidewalls 88 of the helical ports 78, extending from the upstream end of the separation wall 64' to the upstream edge of the trailing sidewall 88 of the helical ports 78. The second ramp vanes 98 may extend from the upstream end of the first ramp vane 96 to the upstream edge of the leading sidewall 86' of the successive helical port 78' in a counterclockwise direction.

FIG. 4 also shows a blocking plate 100 arranged between the upstream edges of the inner vanes 90' and 90", which thus prevents the coal-lean stream from flowing in between the helical ports 78' and 78".

Except as otherwise disclosed herein, the various components shown in outline or in block form in the figures are individually well known and their internal construction and operation are not critical either to the making or using of this invention or to a description of the best mode of the invention.

A presently preferred, but nonetheless illustrative, embodiment of the present invention has been described above. Depending on the application, many details of the described system can be changed without departing from the main scope of the invention. For example, the inner tube 62 is not essential for the present invention, but the particle-lean stream may in some applications fill all the inner volume radially inside the cylindrical tube 64. According to the invention, the direction of rotation of the coal-air streams is unchanged in all parts of the separation vessel, but it can naturally be either clockwise or counterclockwise. The invention is not limited to the application of removing primary air from a coal-air stream, but it can also be used for removing other excess gases from streams of particulate solids and gas.

I claim:

1. A system for removing gas from a stream of a mixture of gas and particulate solids, said system comprising:
    a separation vessel having an upstream end portion and a downstream cowl section, the upstream end portion having an inlet for introducing the stream tangentially into the vessel to separate centrifugally from the stream (i) a rich portion, comprising a solids-rich mixture, proceeding along a helical path at an outer annular portion of the separation vessel to the cowl section, and (ii) a lean portion, comprising a solids-lean mixture, proceeding along a helical path at an inner portion of the separation vessel to the cowl section;
    multiple helical ports through which the rich portion proceeds axially through the cowl section, without significantly losing its momentum, to be discharged axially from the separation vessel; and
    multiple passages between the helical ports through which the lean portion proceeds radially outwards to be discharged from the separation vessel.

2. A system in accordance with claim 1, wherein the cowl section is defined by an outer wall and first and second end plates, and the helical ports are connected to input openings for the rich portion in the first end plate, and to output openings for the rich portion in the second end plate.

3. A system in accordance with claim 2, wherein the first end plate includes an input opening for the lean portion, radially inside the input openings for the rich portion.

4. A system in accordance with claim 1, the separation vessel further including a cylindrical tube and a conical tube, the helical ports being defined between the cylindrical tube and the conical tube.

5. A system in accordance with claim 4, wherein the cylindrical tube extends upstream of the first end plate forming a separation wall for separating the rich portion from the lean portion.

6. A system in accordance with claim 4, wherein the conical tube extends downstream of the second end plate and forms, together with an inner conical tube, an annular flow area, with a gradually reducing outer diameter, for the rich portion.

7. A system in accordance with claim 4, wherein the lean portion flows in the cowl section between the helical ports radially outwards through multiple elongated openings in the cylindrical tube and the conical tube.

8. A system in accordance with claim 1, further including a collection chamber, the lean portion flowing in the cowl section radially outwards through the multiple passages between the helical ports to the annular collection chamber.

9. A system in accordance with claim 8, the separation vessel further including a tangential vent line, the lean portion being discharged from the collection chamber upwards through the tangential vent line.

10. A system in accordance with claim 8, wherein the collection chamber includes block-off means to force the lean portion to rotate in a predetermined direction.

11. A system in accordance with claim 10, wherein the collection chamber volume enlarges in the direction of rotation of the lean portion.

12. A system in accordance with claim 4, further including inner vanes disposed radially inside the cylindrical tube, directing the lean portion into the multiple passages between the helical ports.

13. A system in accordance with claim 5, further including funnel means arranged on the separation wall, directing the rich portion into the inlet openings for the rich portion in the first end plate.

14. A system in accordance with claim 1, wherein the number of helical ports is between three and ten, inclusive.

15. A system in accordance with claim 14, wherein the number of helical ports is between four and eight, inclusive.

16. A system in accordance with claim 2, wherein the outlet openings in the second end plate are rotated from the corresponding inlet openings in the first end plate by about 5° to about 60°.

17. A system in accordance with claim 16, wherein the outlet openings in the second end plate are rotated from the corresponding inlet openings in the first end plate by about 20° to about 40°.

18. A system in accordance with claim 2, wherein the outlet openings for the rich portion in the second end plate have an at least 1.5 times larger width-to-height ratio than the inlet openings for the rich portion in the first end plate.

19. A system in accordance with claim 18, wherein the outlet openings for the rich portion in the second end plate have an at least three times larger width-to-height ratio than the inlet openings for the rich portion in the first end plate.

20. A method for removing gas from a stream of a mixture of gas and particulate solids, comprising the steps of:
  introducing the stream tangentially into a separation vessel through an inlet at an upstream end portion of the vessel;
  separating centrifugally from the stream a rich portion, comprising a solids-rich mixture, and a lean portion, comprising a solids-lean mixture;
  allowing the rich portion to proceed along a helical path at an outer annular portion of the separation vessel to a cowl section at a downstream end portion of the separation vessel;
  allowing the lean portion to proceed along a helical path at an inner portion of the separation vessel to the cowl section;
  allowing the rich portion to proceed axially through the cowl section through multiple helical ports, without significantly losing its momentum, and discharging the rich portion from the separation vessel; and
  allowing the lean portion to proceed radially outwards through multiple passages between the helical ports and discharging the lean portion from the separation vessel.

21. A method in accordance with claim 20, further including directing the rich portion to the helical ports through input openings for the rich portion in a first end plate of the cowl section, and discharging the rich portion from the helical ports through outlet openings for the rich portion in a second end plate of the cowl section.

22. A method in accordance with claim 21, further including directing the lean portion to the cowl section through an annular input opening in the inner portion of the first end plate.

23. A method in accordance with claim 21, further including separating the rich portion from the lean portion by a cylindrical wall upstream of the first end plate of the cowl section.

24. A method in accordance with claim 20, further including allowing the lean portion to flow through the passages between the helical ports into an annular collection chamber.

25. A method in accordance with claim 24, further including discharging the lean portion from the collection chamber upwards through a tangential vent line.

* * * * *